(12) United States Patent
Yoshida et al.

(10) Patent No.: US 6,352,797 B1
(45) Date of Patent: Mar. 5, 2002

(54) LITHIUM ION BATTERY AND METHOD FOR FORMING THE SAME

(75) Inventors: Yasuhiro Yoshida; Michio Murai; Takayuki Inuzuka; Kouji Hamano; Hisashi Shiota; Shigeru Aihara; Daigo Takemura; Jun Aragane; Hiroaki Urushibata, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/423,629
(22) PCT Filed: Mar. 17, 1998
(86) PCT No.: PCT/JP98/01106
§ 371 Date: Nov. 16, 1999
§ 102(e) Date: Nov. 16, 1999
(87) PCT Pub. No.: WO99/48162
PCT Pub. Date: Sep. 23, 1999

(51) Int. Cl.[7] ............................................. H01M 10/40
(52) U.S. Cl. ...................... 429/313; 429/316; 429/317; 29/623.1
(58) Field of Search ...................... 29/623.1; 429/317, 429/316, 313, 306

(56) References Cited

U.S. PATENT DOCUMENTS 5,437,692 A    8/1995  Dasgupta et al.
5,925,483 A  * 7/1999  Kejha et al. ................. 429/303
5,981,107 A   11/1999  Hamano et al.
6,124,061 A  * 9/2000  Hamano et al. ............. 429/316

FOREIGN PATENT DOCUMENTS

| JP | 50-21634  | 6/1973  |
| JP | 62-8471   | 1/1987  |
| JP | 63-41864  | 3/1988  |
| JP | 9-500485  | 1/1997  |
| JP | 9-293518  | 11/1997 |

* cited by examiner

Primary Examiner—John S. Maples
(74) Attorney, Agent, or Firm—Oblon, Spivak, McClelland, Maier & Neustadt, P.C.

(57) ABSTRACT

The invention is a high-performance lithium ion secondary battery which needs no firm case so that it is possible to reduce the size and weight and to design the shape freely and yet which secures high structural strength and safety. The method of the invention for forming a lithium ion battery comprises the step of joining a positive electrode (3) having a positive electrode active material layer (32) joined to a positive electrode current collector (31) and a negative electrode (5) having a negative electrode active material layer (52) joined to a negative electrode current collector (51) with an adhesive resin (6) comprising at least partially a plastic resin being present in parts therebetween and the step of deforming the adhesive resin (6). The method achieves simplification and improvement of productivity in forming a lithium ion battery.

16 Claims, 7 Drawing Sheets

LITHIUM ION BATTERY AND METHOD FOR FORMING THE SAME

TECHNICAL FIELD

This invention relates to a lithium ion battery. More particularly, it relates to a high-performance secondary battery which can have an arbitrary shape, such as a thin shape, and a method for forming the same.

BACKGROUND OF THE INVENTION

There has been an extraordinary demand for reduction in size and weight of portable electronic equipment, and the realization relies heavily on improvement of battery performance. To meet the demand, development and improvement of batteries from various aspects have been proceeding. Characteristics required of batteries include a high voltage, a high energy density, safety, and freedom of shape design. Of conventional batteries, lithium ion batteries are the most promising secondary batteries for realizing a high voltage and a high energy density and are still under study for further improvements.

A lithium ion battery in current practical use comprises a positive plate prepared by applying to a current collector powder of lithium-cobalt oxide, etc., a negative plate similarly prepared by applying to a current collector powder of a carbonaceous material. In order for these electrodes (i.e., a positive electrode and a negative electrode) to function as a lithium ion battery, there must be an ion conducting layer having no electron conductivity through which lithium ions can migrate between the two electrodes. In general, a separator which is made of a porous film of polyethylene, etc. and is filled with a nonaqueous electrolytic solution is interposed between the electrodes as an ion conducting layer.

Figure 7:
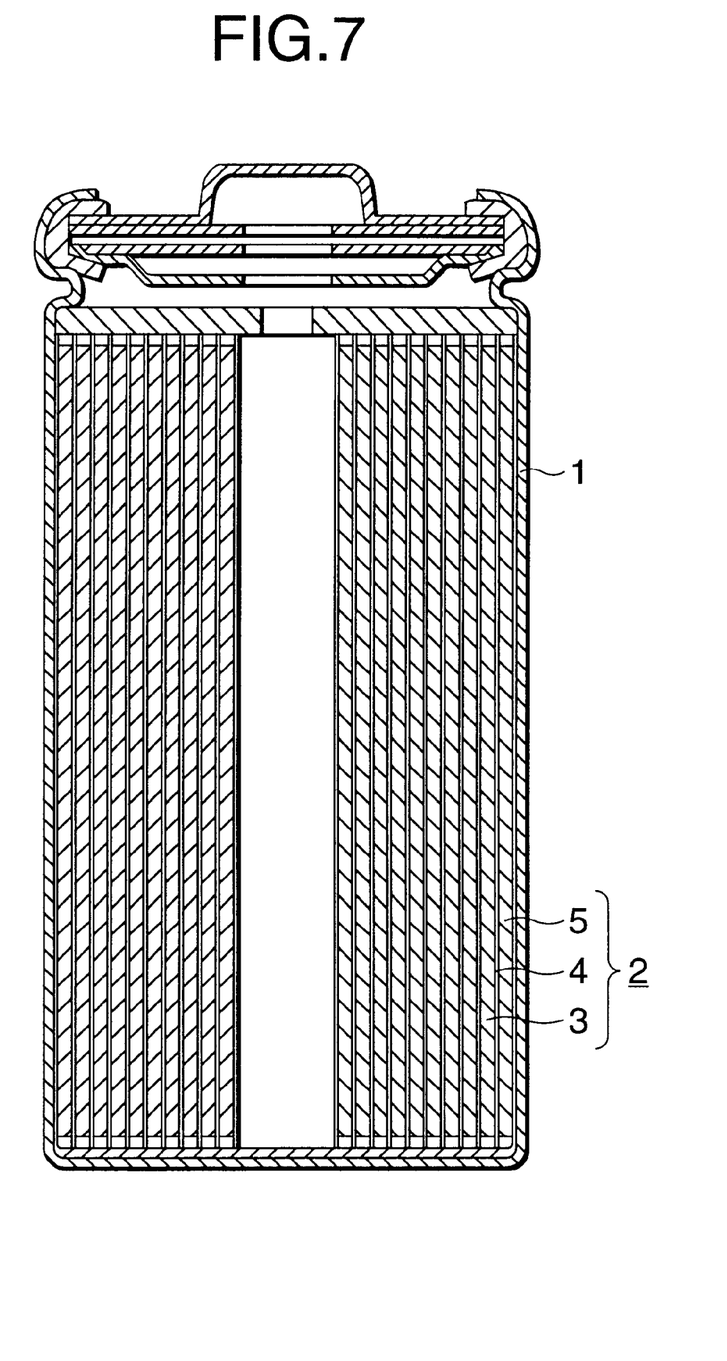
FIG. 7 is a schematic cross section of a conventional lithium ion battery.

As shown in FIG. 7, a rigid case 1 made of metal, etc. is used for holding a positive electrode 3, a negative electrode 5, and a separator 4 containing an electrolytic solution, etc. Without the case 1, it would be difficult to maintain the joined state of the electrodes 3 and 5 and the separator 4, and the joint might be separated, resulting in deterioration of battery characteristics. However, the case 1 makes the battery heavy and hinders free shape designing. Hence, batteries that do not need such a case 1 have now been under study. One of the subjects in developing batteries needing no case 1 is how to join the electrodes 3 and 5 to the separator 4 interposed therebetween and to maintain the joined state without applying external force.

In this connection, U.S. Pat. No. 5,460,904 discloses a method for forming an ion conducting layer sandwiched in between a positive electrode and a negative electrode, which teaches use of a polymer having a plasticizer mixed therein with at least part of the plasticizer being displaced with an electrolytic solution. However, the method disclosed in U.S. Pat. No. 5,460,904 is not favorable as a production method because a treatment with an organic solvent is involved in the formation of the ion conducting layer, which necessitates a step for removing the organic solvent and equipment for the organic solvent removal.

Further, in order to realize a practically useful lithium ion battery of thin type, it is necessary to develop a battery structure and a method of forming the structure which secures high productivity in joining a positive electrode and a negative electrode while assuring sufficient structural strength and safety as a battery.

DISCLOSURE OF THE INVENTION

A first method for forming a lithium ion battery according to the invention is a method for forming a lithium ion battery comprising a positive electrode having a positive electrode active material layer and a negative electrode having a negative electrode active material layer as constituent elements, the constituent elements being impregnated with an electrolytic solution, which comprises the step of joining the positive electrode and the negative electrode with an adhesive resin containing at least partially a plastic resin being present in parts therebetween and the step of deforming the adhesive resin.

A second method for forming a lithium ion battery according to the invention is the above-described first method for forming a lithium ion battery, wherein the step of deforming the adhesive resin is carried out by applying at least the pressure that causes the plastic resin to undergo plastic deformation.

According to the first and second methods, since the adhesive resin contains at least partially a plastic resin, (i) drying is not necessary every time the positive electrode and the negative electrode are joined, (ii) a holding tool for maintaining the joined state is not required, (iii) the step of deforming the adhesive resin does not need to be done one by one and can be effected all at once, (iv) the production equipment can be simplified, which will lead to a great improvement of productivity, and (v) the contact area of the adhesive resin to the positive and negative electrodes is increased by deforming the plastic resin to enhance the adhesive force so that a completed battery may have a high battery strength enough for practical use.

A third method for forming a lithium ion battery according to the invention is the above-described first method, wherein the plastic resin is a thermoplastic resin. According to this method, since the adhesive resin contains a thermoplastic resin at least partially, the production equipment can be simplified, which will lead to a great improvement in productivity. In case of heat generation due to abnormalities such as a short-circuit, the thermoplastic resin melts to shut off the electric current. Therefore, a highly safe lithium ion battery can be obtained.

A fourth method for forming a lithium ion battery according to the invention is the above-described third method, wherein the step of deforming the adhesive resin is carried out by heating.

A fifth method for forming a lithium ion battery according to the invention is the above-described fourth method, wherein the heating is at or above the temperature at which the thermoplastic resin develops flowability.

According to the fourth and fifth methods, adhesive force develops on the thermoplastic resin's flowing. It follows not only that the contact area between the resin and the positive and negative electrode surfaces increases but that the resin penetrates into the fine pores on the surfaces to produce an anchoring effect. Therefore, a practically useful lithium ion battery having high adhesive strength can be obtained.

A sixth method for forming a lithium ion battery according to the invention is the above-described third method, wherein the step of deforming the adhesive resin is carried out by applying ultrasonic waves under pressure. According to this method, because the resin deforms efficiently by ultrasonic waves application, it is possible to achieve adhesion even under a low pressure or at a low heating temperature. Further, since only the surface portion of the thermoplastic resin is selectively heated, the adhesion can be achieved efficiently.

A first lithium ion battery according to the invention has a laminate electrode body comprising a positive electrode having a positive electrode active material layer joined to a positive electrode current collector, a negative electrode having a negative electrode active material layer joined to a negative electrode current collector, and an adhesive resin comprising a plastic resin at least partially, the adhesive resin being interposed between the positive electrode and the negative electrode and forming voids so that the positive electrode and the negative electrode connect thereby. According to this battery structure, because the adhesive resin comprises a plastic resin at least partially, the production equipment can be simplified, which will lead to a great improvement in productivity. Further, since the contact area of the adhesive resin to the positive and negative electrodes and a separator has been increased by deforming the plastic resin to enhance the adhesive force, the completed battery has a high battery strength enough for practical use.

A second lithium ion battery according to the invention is the above-described first battery wherein the plastic resin is a thermoplastic resin. Because the adhesive resin contains a thermoplastic resin at least partially, the production equipment can be simplified, which will lead to a great improvement in productivity. Further, the lithium ion battery has high safety because the thermoplastic resin melts to shut off the electric current in case of heat generation due to abnormalities such as a short-circuit.

A third lithium ion battery according to the invention is the above-described first battery, wherein the void area is from 30 to 90% based on the interface between the positive and the negative electrodes. In this embodiment, with the voids formed between the positive and the negative electrodes being filled with an electrolytic solution, the resistance to ion conduction between the positive and negative electrodes is reduced sufficiently, which makes use at a high load rate possible and assures adhesive strength sufficient for practical use.

A fourth lithium ion battery according to the invention is the above-described first battery, wherein the distance between the positive electrode and the negative electrode is 100 $\mu$m or smaller. In this embodiment, where the voids formed between the positive and the negative electrodes are filled with an electrolytic solution, the resistance to ion conduction between the positive and negative electrodes is reduced sufficiently, which makes use at a high load rate possible.

A fifth lithium ion battery according to the invention is the above-described first battery which has a plurality of the laminate electrode bodies. This embodiment provides a lithium ion battery which is compact and yet has a stable and high capacity.

BEST MODE FOR CARRYING OUT THE INVENTION

The invention is applied to a battery structure having a positive electrode, a negative electrode, and an ion conducting layer interposed therebetween. While the modes for carrying out the invention hereinafter described are concerned chiefly with a battery of single electrode body type having a single unit electrode body composed of a positive electrode, an ion conducting layer, and a negative electrode, they also apply to a laminated battery body having a stack of such unit electrode bodies.

Figure 1:
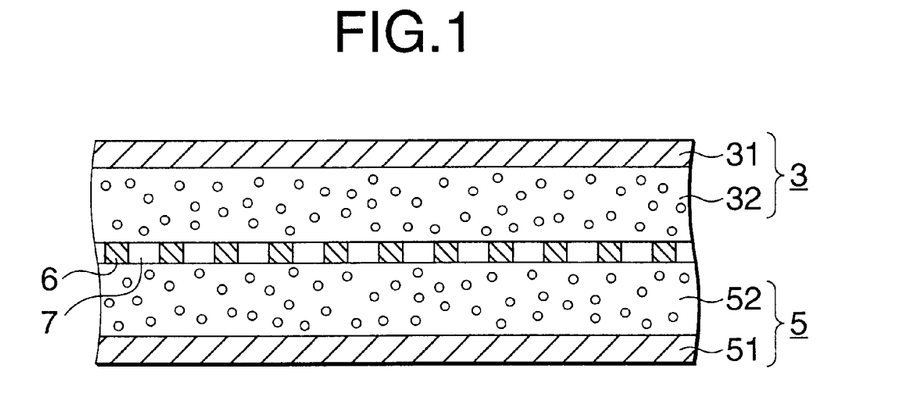
FIG. 1 is a schematic cross section showing the battery structure of a lithium ion battery according to one mode for carrying out the invention.

FIG. 1 is a schematic cross section illustrating the battery structure, i.e., the unit electrode body, of a lithium ion battery according to a mode for carrying out the invention. In the Figure, numeral 3 indicates a positive electrode having a positive electrode active material layer 32 joined to a positive electrode current collector 31; numeral 5 is a negative electrode having a negative electrode active material layer 52 joined to a negative electrode current collector 51; and numeral 6 indicates an adhesive comprising a plastic resin at least partially, which is applied between the positive electrode and the negative electrode in parts, for example, in a dotted, striped or checked pattern to join the active material layers 32 and 52. A nonaqueous electrolytic solution containing lithium ions is held in voids 7 by which the positive electrode active material layer 32 and the negative electrode active material layer 52 connect. Thus, the adhesive resin functions as an ion conducting layer. The plastic resin is a resin which is solid and self-adhesive at ambient temperature and deforms on heat or pressure application.

A lithium ion battery having the above-mentioned structure is formed by, for example, the following method. The method for forming a battery according to the invention comprises applying an adhesive resin 6 between a positive electrode 3 and a negative electrode 5 in parts and deforming the adhesive resin 6 by the method described hereunder, for example, by pressure or heat application. By the deformation of the adhesive resin 6, the voids 7 between the positive electrode 3 and the negative electrode 5 are pressed to reduce their depth L to a prescribed value.

Any adhesive resin that does not dissolve in an electrolytic solution can be used in the invention as an adhesive resin 6. The plastic resin which is contained in the adhesive resin 6 is not particularly limited. Examples of useful plastic resins include polyolefins, polyglycols, and silicon resins. The adhesive resin 6 may further contain organic or inorganic powder, fiber, etc.

The total area of the voids 7 which are created by the partly applied adhesive resin 6 is preferably 30 to 90%, particularly about 60%, of the interface between the active material layers 32 and 52. With this area ratio being less than 30%, the electrical connection between the active material layers 32 and 52 would be insufficient, resulting in increased resistance to ion conduction, which makes it difficult to obtain sufficient battery characteristics. If the area ratio exceeds 90%, the adhesion between the positive electrode 3 and the negative electrode 5 is insufficient, causing separation.

The depth of the voids 7 created between the active material layers 32 and 52, i.e., the distance L between the active material layers 32 and 52 is subject to variation depending on the ion conductivity of the electrolytic solution used. In case where the electrolytic solution used has an ion conductivity of about $10^{-2}$ S/cm as is commonly employed, the distance L is 100 $\mu$m or smaller. A distance of 10 $\mu$m or greater is preferred so that the plastic resin can melt to perform the current cut-off function in case of heat generation due to abnormalities such as a short-circuit.

Figure 2A:
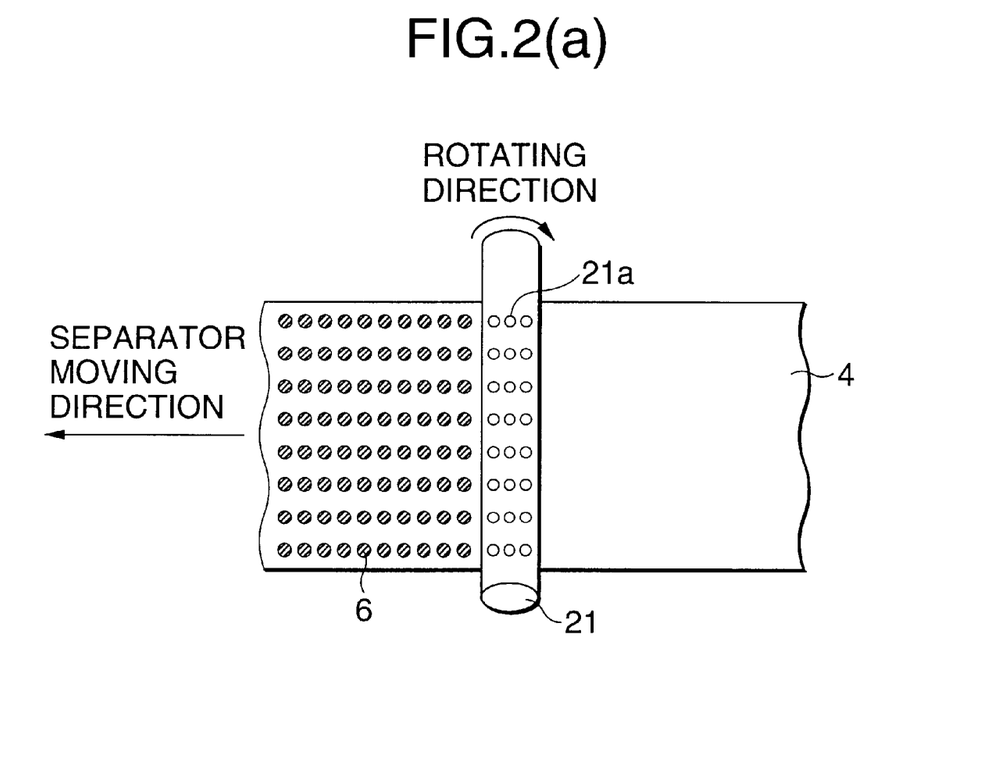
FIG. 2 schematically illustrates a method for applying an adhesive resin by means of a coater according to one mode for carrying out the invention.
Figure 2B:
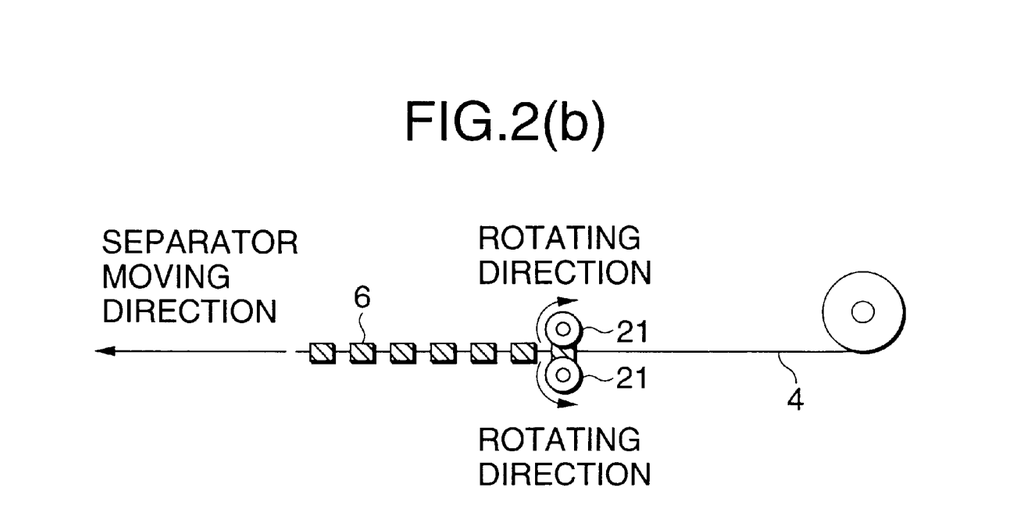

The adhesive resin 6 is partly disposed between the positive electrode 3 and the negative electrode 5 by distributing the resin in the form of powder, threads, net, perforated film, etc. on one or both of the surfaces of the positive electrode 3 and of the negative electrode 5 that are to face each other when assembled into a battery in such a manner that the entire area of the surfaces may not be covered with the resin. Specifically, a method by using a coater can be adopted. This is a coating method in which, as shown in the perspective view of FIG. 2(a) and the side view of FIG. 2(b), a molten resin 6 is picked up with a rotating roll 21 having depressions 21a in dots and then transferred. The manner of applying the adhesive is not particularly limited, and a spray coating method and a roll coating method in which a molten resin is extruded through small holes of a roll are also employable Distributed without completely covering the entire surface, the adhesive resin forms voids 7 in which a liquid electrolyte can be held between the positive electrode 3 and the negative electrode 5. A liquid electrolyte being held in the voids 7, the resistance to ion conduction between the positive electrode 3 and the negative electrode 5 can be reduced to such a level as in a conventional battery using an exterior case. In addition, since the adhesive 6 adheres the positive electrode 3 and the negative electrode 5 to each other, the positive electrode 3 and the negative electrode 5 can be brought into contact without the aid of an exterior case.

After the positive electrode 3 and the negative electrode 5 are superposed with the adhesive resin 6 partly applied therebetween, the adhesion between the electrodes is achieved by the step of applying at least the pressure which causes the adhesive resin 6 to undergo plastic deformation. The step of pressure application can be done at any time after completion of superposition. This step is effective in enlarging the contact area of the adhesive resin 6 to the positive electrode 3 and to the negative electrode 5 so as to enhance the adhesive force of the adhesive resin 6. As a result, there is obtained a completed battery with a sufficient battery strength enough to withstand practical use. It is desirable that the strength relies on the anchoring effect produced by the adhesive resin 6 penetrating into the fine pores on the surfaces of the positive electrode 3 and of the negative electrode 5. Even where the strength relies merely on the self-adhesiveness of the adhesive resin 6, sufficient strength for battery formation could be secured only if the contact area between the adhesive resin 6 and the surfaces of the positive electrode 3 and of the negative electrode 5 is large enough. This step is also necessary for regulating the thickness of the adhesive resin 6 interposed between the positive electrode 3 and the negative electrode 5. If the adhesive resin 6 has too large a thickness, the battery undesirably has a reduced charge capacity.

Because the plastic resin exhibits self-adhesiveness, the above-described manner of adhesion is advantageous in that (i) drying is not necessary every time the positive electrode 3 and the negative electrode 5 are joined, (ii) a holding tool for maintaining the joined state is not required, (iii) the step of applying at least the pressure causing plastic deformation of the adhesive resin does not need to be conducted successively and can be effected all at once, and (iv) a solvent to be used is reduced in amount so that the production equipment can be simplified, which leads to greatly improved productivity.

Figure 3:
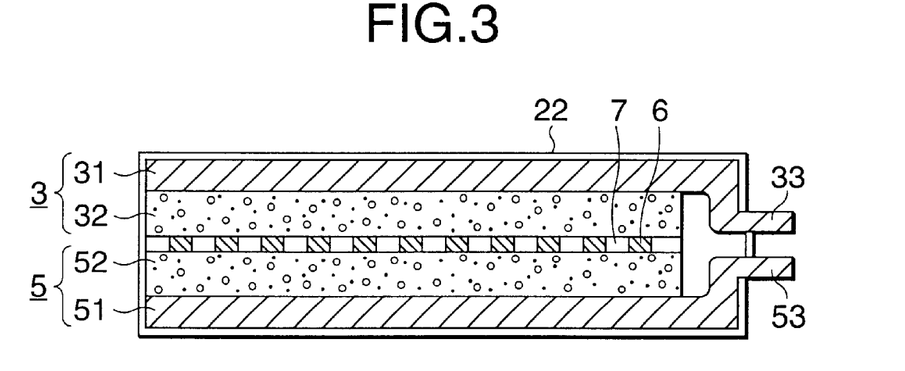
FIG. 3 is a schematic cross section showing a lithium ion battery according to one mode for carrying out the invention.

The pressure application for adhesion is followed by drying, and a current collecting tabs 33 and 53 are connected to the resulting laminate electrode body 8 by spot welding, etc. The laminate electrode body is inserted into a cylinder made of an aluminum-laminated film 22. An electrolytic solution is poured into the cylinder, and the opening of the aluminum-laminated film is sealed to complete a lithium ion battery having a unit electrode body (see FIG. 3).

A nonaqueous liquid electrolyte containing lithium ions that has been employed in conventional batteries can be used as a liquid electrolyte in the electrolytic solution which serves as an ion conductor. Examples of useful solvents for the liquid electrolyte include an ester solvent group, such as ethylene carbonate, propylene carbonate, dimethyl carbonate, and diethyl carbonate; an ether solvent group, such as dimethoxyethane, diethoxyethane, diethyl ether, and dimethyl ether; and a mixed solvent consisting of two or more members selected from among the same group of solvents or from among different groups of solvents. Examples of useful electrolyte salts used in the electrolytic solution are $LiPF_6$, $LiAsF_6$, $LiClO_4$, $LiBF_4$, $LiCF_3SO_3$, $LiN(CF_3SO_2)_2$, $LiC(CF_3SO_2)_3$, and $LiN(C_2F_5SO_2)_2$.

The active material layers 32 and 52 are formed by mixing a powdered positive electrode active material and a powdered negative electrode active material with the respective binder resins into paste and applying the paste to a positive and a negative electrode current collector 31 and 51, respectively, followed by drying.

The binder resins which can be used for binding an active material into an electrode layer include those which neither dissolve in an electrolytic solution nor undergo electrochemical reaction inside the battery. For example, polymers or copolymers of vinylidene fluoride, ethylene fluoride, acrylonitrile, ethylene oxide, etc. and ethylenepropylenediamine rubber can be used.

The active materials which can be used in the positive electrode 3 include complex oxides of lithium and a transition metal, such as cobalt, nickel or manganese; chalcogenides containing lithium; or complex oxides of these compounds; and the above-mentioned complex oxides, Li-containing chalcogenides or complex oxides thereof which contain a trace amount of various dopant elements. Graphite is added to these substances as an electron conductor. Preferred active materials for use in the negative electrode 5 include carbonaceous compounds, such as graphite, graphitizing carbon, non-graphitizing carbon, polyacene, and polyacetylene; and aromatic hydrocarbon compounds having an acene structure, such as pyrene and perylene. The negative electrode active material is not limited to these examples, and any other substances capable of intercalating and disintercalating lithium ions, which are necessary for a battery operation, can be used. These active materials are used in a particulate form. Particles having a particle size of 0.3 to 20 $\mu$m can be used. A particularly preferred particle size is 0.3 to 5 $\mu$m. Carbon fiber is also useful as a negative electrode active material 52. Where the particle size is too small, too large a surface area of the active material will be covered with the adhesive on adhesion, and lithium ion intercalation and disintercalation are not carried out efficiently in charging and discharging, resulting in reduction of battery characteristics. If the particle size is too large, it is not easy to form the active material mixture into a thin film, and the packing density is reduced.

Any metal stable in the inside of a battery can be used as a current collector 31 or 51. Aluminum is preferred for the positive electrode 3, and copper is preferred for the negative electrode 5. The current collectors 31 and 51 can be foil, net, expanded metal, etc. Foil is preferred for obtaining smoothness of the electrode.

While in the above-described method adhesion is achieved by plastic deformation of the adhesive resin, adhesion may be carried out by using an adhesive resin 6 containing a thermoplastic resin and heating the adhesive resin at or above the temperature at which the thermoplastic resin deforms easily. Any means for heating, such as a hot plate, an oven or an infrared heater, can be chosen.

The heating can be at or above the temperature at which the thermoplastic resin gets flowable. In this case, the contact area between the adhesive resin and the surfaces of the positive electrode 3 and of the negative electrode 5 increases and, in addition, the resin penetrates into the fine pores of the surfaces to produce an anchoring effect. Where the thermoplastic resin is highly viscous, it is sometimes desirable, while not essential, to apply pressure during heating.

Use of the adhesive resin 6 containing the thermoplastic resin not only makes it easy to form a battery structure but brings about the effect that the resin melts to shut off the electric current in case the temperature should elevate due to abnormalities such as an internal shortage.

Any thermoplastic resin can be used here as long as it has a melting point of 200° C. or lower and is insoluble in an electrolytic solution. The thermoplastic resin may contain high-melting components, inorganic matter, etc. unless such may not impair flowability on heating.

Where the adhesive resin 6 containing the thermoplastic resin is used, adhesion may be carried out by applying ultrasonic waves under pressure. Ultrasonic waves cause the resin to deform efficiently, making adhesion feasible even under low pressure or at low temperature. Further, ultrasonic waves application produces the effect that the portion of the thermoplastic resin in contact with the electrodes is selectively heated so that the adhesion can be achieved very efficiently.

The heating step is conducted at any time after all the electrodes are superposed one on top of the other. This step is effective in sufficiently increasing the heat resistance of the completed battery.

While the modes for carrying out the invention have been described with particular reference to a battery having a single unit electrode body 8, they are applicable to batteries of laminated electrode body type having a plurality of the unit electrode bodies. Use of a plurality of the unit electrode bodies provides a lithium ion battery that is compact and yet has a stable and large battery capacity. For example, a battery of laminated electrode body type can have the structure shown in FIG. 4 in which positive electrodes 3 and negative electrodes 5 alternate with a cut sheet of a separator 4 being interposed between every positive electrode and every negative electrode; the structures shown in FIGS. 5 and 6 in which a positive electrode 3 and a negative electrode 5 are rolled up with a band of a separator 4 interposed therebetween; and a structure (not shown) in which a positive electrode 3 and a negative electrode 5 are each inserted alternately in the folds of a folded band of a separator 4. The method for producing the laminated electrode body type batteries shown in FIGS. 4 to 6 will be described in more detail in Examples hereinafter given.

Examples are given below to illustrate the invention in greater detail, but the invention is by no means limited thereto.

EXAMPLE 1

Eighty-seven percents by weight of $LiCoO_2$, 8 wt % of graphite powder and, as a binder resin therefor, 5 wt % of polyvinylidene fluoride were mixed to prepare a positive electrode active material paste. The paste was applied to a 20 $\mu$m-thick aluminum foil current collector with a doctor blade to a coating thickness of about 100 $\mu$m to form a positive electrode.

Ninety-five weight percents of Mesophase Microbead Carbon (produced by Osaka Gas Co., Ltd.) and 5 wt % of polyvinylidene fluoride as a binder resin were mixed to prepare a negative electrode active material paste. The paste was applied to a 12 $\mu$m-thick copper foil current collector with a doctor blade to a thickness of about 100 $\mu$m to make a negative electrode.

A rectangle of 5 cm by 4 cm was cut out from each of the positive electrode and the negative electrode, and a current collecting terminal (tab) was attached to each cut piece of the positive electrode and the negative electrode.

A hot-melt adhesive of SIS type (AK-1, produced by Kanebo NSC K.K.; softening point: about 100° C.) was partly applied onto the positive electrode and the negative electrode by spraying in an amount of about 20 g per $m^2$. The adhesive-coated positive and negative electrodes were brought into contact with each other and the adhesive layer was pressed by applying a pressure of 5 g per $cm^2$ thereby to reduce the space between the positive and the negative electrodes.

The resulting electrode body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured into the electrode body. The aluminum-laminated film was sealed to complete a battery.

The battery thus prepared had battery characteristics in terms of weight energy density of 80 Wh/kg at a current value 1C. After 200 charge and discharge cycles at a current value C/2, as high as about 90% of the initial charge capacity was retained.

EXAMPLE 2

A butene-propylene copolymer (Nitta Gelatin K.K.; softening point: 84° C.) was applied to a rectangular cut piece (5 cm×4 cm) each of a positive electrode and a negative electrode, which were prepared in the same manner as in Example 1 and to which a current collecting terminal was attached, in a dotted pattern by means of a coater (CP3000, manufactured by MELTEX K.K.) in an amount of about 15 g per $m^2$. The positive electrode and the negative electrode were brought into contact with each other and pressed under a pressure of 5 $g/cm^2$ at 80° C. for 1 minute.

The resulting electrode body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured into the electrode body. The aluminum-laminated film was sealed to complete a battery.

The battery thus prepared had battery characteristics in terms of weight energy density of 75 Wh/kg at a current value 1C. After 200 charge and discharge cycles at a current value C/2, about 80% of the initial charge capacity was secured.

EXAMPLE 3

A butene-propylene copolymer (Nitta Gelatin K.K.; softening point: 84° C.) was applied to a rectangular cut piece (5 cm×4 cm) each of a positive electrode and a negative electrode, which were prepared in the same manner as in Example 1 and to which a current collecting terminal was attached, in a dotted pattern by means of a coater (CP3000, manufactured by MELTEX K.K.) in an amount of about 15 g per m². The positive electrode and the negative electrode were brought into contact with each other and, in this state, heated at 100° C. for 1 minute, followed by cooling.

The resulting electrode body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured into the electrode body. The aluminum-laminated film was sealed to complete a battery.

The battery thus prepared had battery characteristics in terms of weight energy density of 70 Wh/kg at a current value 1C. After 200 charge and discharge cycles at a current value C/2, about 80% of the initial charge capacity was secured.

EXAMPLE 4

An ethylene-methyl methacrylate-maleic anhydride copolymer ("Bondyne" produced by Sumitomo Chemical Co., Ltd.; softening point: 100° C.) was applied to a rectangular cut piece (5 cm×4 cm) each of a positive electrode and a negative electrode, which were prepared in the same manner as in Example 1 and to which a current collecting terminal was attached, in a dotted pattern by means of a coater (CP3000, manufactured by MELTEX K.K.) in an amount of about 18 g per m². The positive electrode and the negative electrode were brought into contact with each other and bonded by pressing under a pressure of 20 g/cm² at 80° C. for 1 minute.

The resulting electrode body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured into the electrode body.

The battery thus prepared had battery characteristics in terms of weight energy density of 78 Wh/kg at a current value 1C. After 200 charge and discharge cycles at a current value C/2, about 80% of the initial charge capacity was secured.

EXAMPLE 5

Polyethylene powder was uniformly scattered on a rectangular cut piece (15 cm×10 cm) each of a positive electrode and a negative electrode, which were prepared in the same manner as in Example 1 and to which a current collecting terminal was attached, in an amount of about 30 g per m².

The negative electrode was superposed thereon and united into one body by means of an ultrasonic welding machine. Care was taken to minimize the ultrasonic wave output per unit area so as not to destroy the electrodes.

The resulting electrode body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured into the electrode body. The aluminum-laminated film was sealed to complete a battery.

The battery thus prepared had battery characteristics in terms of weight energy density of 60 Wh/kg at a current value 1C. After 100 charge and discharge cycles at a current value C/2, about 80% of the initial charge capacity was secured.

EXAMPLE 6

Figure 4:
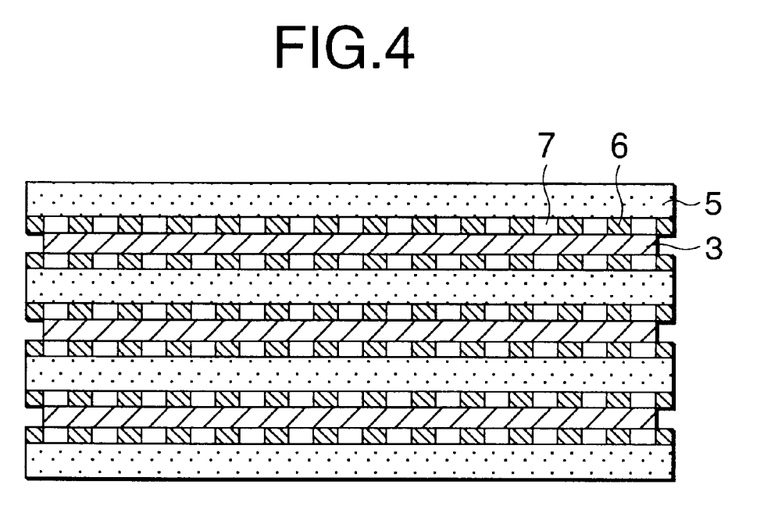
FIGS. 4, 5, and 6 are each a schematic cross section showing the battery structure of a lithium ion battery according to another mode for carrying out the invention.

Example 6 shows formation of a lithium ion battery having the flat laminated battery body shown in FIG. 4.

Rectangular positive electrodes and negative electrodes each having a size of 5 cm×4 cm were prepared from the same materials in the same manner as in Example 1. An adhesive resin H-6825 (a trade name, produced by Nitta Gelatin K.K.) was applied in a dotted pattern to both sides of every positive electrode, and the double-coated positive electrodes and the negative electrodes were superposed alternately. The laminate was bonded by applying a pressure of about 100 g per cm² to form a uniform thin structure composed of a stack of a plurality of unit electrode bodies.

The resulting laminated electrode body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured. into the electrode body. The aluminum-laminated film was sealed to complete a battery.

EXAMPLE 7

Figure 5:
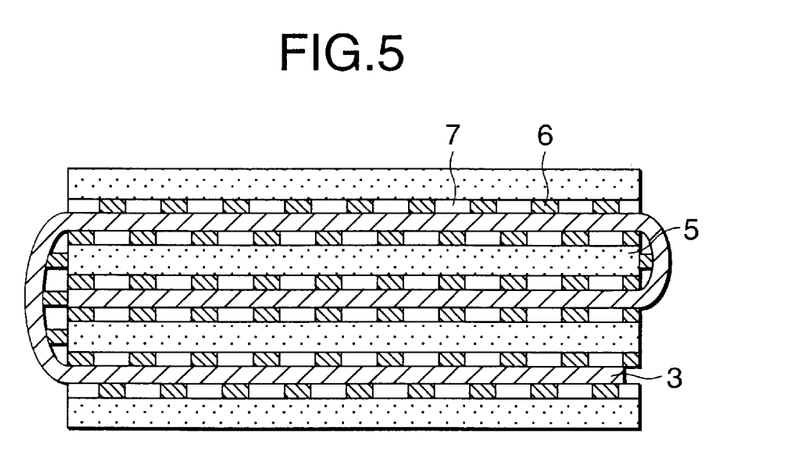

Example 7 shows formation of a lithium ion secondary battery having the flat roll type laminated battery body shown in FIG. 5.

A positive electrode (or a negative electrode) of 5 cm by 23 cm and negative electrodes (or positive electrodes) of 5 cm by 4 cm each were prepared in the same manner as in Example 1. A current collecting terminal was attached to the end of every electrode by spot welding. Both sides of the negative electrode (or the positive electrode) were spray-coated with AK-1 (produced by Kanebo NSC K.K.; softening point: about 100° C.) to a coating weight of about 10 g/m². One end of the negative electrode (or the positive electrode) was folded back at a prescribed length while inserting one of the positive electrodes (or the negative electrodes) into the folded portion. Another positive electrode (or negative electrode) was stuck to the coated and folded part at the position facing to the previously inserted positive electrode (or negative electrode). The stuck positive electrode (or the negative electrode) was wrapped in the positive electrode (or the negative electrode) by rolling. Then another positive electrode (or negative electrode) was superposed on the negative electrode (or the positive electrode) so as to face the previously inserted positive electrode (or negative electrode) and wrapped in the negative electrode (or the positive electrode) by further rolling. These steps were repeated to roll up the electrodes into a flat ellipsoid.

The resulting battery body having a flat ellipsoidal shape was pressed under a pressure of about 100 g per cm² to bond the electrodes to obtain a flat roll type laminated battery body as shown in FIG. 5.

The battery body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured into the electrode body. The aluminum-laminated film was sealed by thermal fusion to complete a lithium ion secondary battery.

EXAMPLE 8

Figure 6:
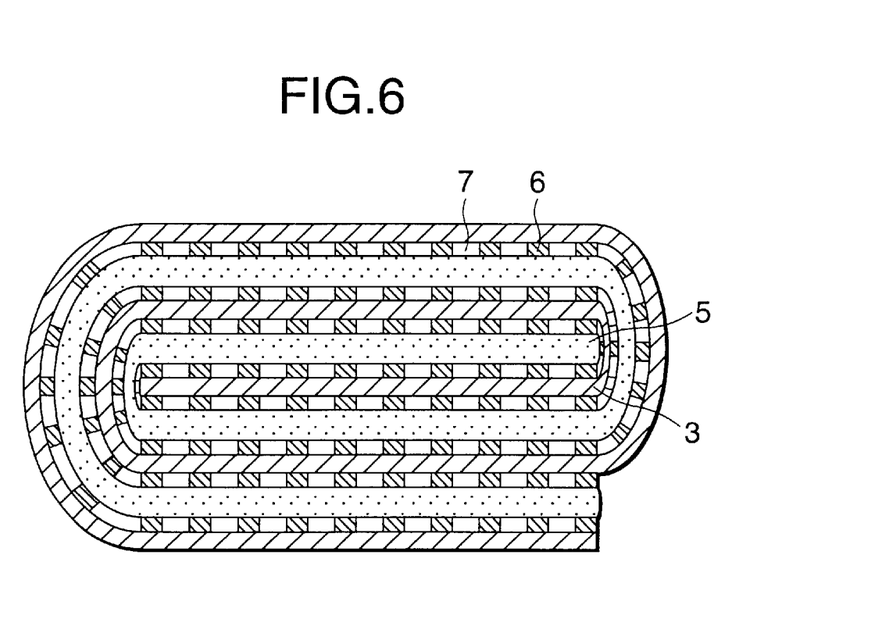

Example 8 shows a method for preparing a lithium ion secondary battery having the flat roll type laminated battery body shown in FIG. 6.

A positive electrode and a negative electrode each comprising a current collector foil having applied to both sides thereof an active material were prepared in the same manner as in Example 1. Each electrode was cut to a size of 5 cm by 23 cm, and a current collecting terminal was attached to the end of the electrode.

Both sides of the positive electrode (or the negative electrode) were spray-coated with a hot-melt adhesive AK-1 (produced by Kanebo NSC K.K.; softening point: about 100° C.) to a coating weight of about 40 g per m².

The positive electrode (or the negative electrode) was folded at every 5 cm and rolled up while being brought into contact with the negative electrode (or the positive electrode) to form a rolled structure. The resulting structure was pressed under a pressure of about 100 g per cm² to bond the electrodes to obtain a uniform thin structure.

The resulting battery body was inserted into a cylinder made of an aluminum-laminated film and dried thoroughly. An electrolytic solution prepared from ethylene carbonate and 1,2-dimethoxyethane as solvents and lithium hexafluorophosphate as an electrolyte was poured into the electrode body. The aluminum-laminated film was sealed to complete a lithium ion secondary battery.

The battery thus prepared had battery characteristics in terms of weight energy density of 70 Wh/kg at a current value 1C. After 100 charge and discharge cycles at a current value C/2, about 80% of the initial charge capacity was secured.

Industrial Applicability

The present invention brings about simplification and therefore improvement of productivity in forming a high-performance secondary battery for use in portable electronic equipment, such as portable personal computers and cellular phones, which can have reduced size and weight, an arbitrary shape, high structural strength, and safety.

What is claimed is:

1. A lithium ion battery comprising a laminate electrode body, said body comprising a positive electrode having a positive electrode active material layer joined to a positive electrode current collector, a negative electrode having a negative electrode active material layer joined to a negative electrode current collector, and an adhesive resin comprising an at least partially plastic resin, said adhesive resin being interposed between the positive electrode and the negative electrode and forming an interface with voids connecting the positive electrode and the negative electrode.

2. A lithium ion battery according to claim 1, characterized in that the plastic resin is a thermoplastic resin.

3. A lithium ion battery claim 1, characterized in that an area of the voids is from 30 to 90% based on an interface area between positive and negative electrodes.

4. A lithium ion battery according to claim 1, characterized in that the positive electrode and the negative electrode are separated by 100 $\mu$m or smaller.

5. A lithium ion battery according to claim 1, characterized by having a plurality of the laminate electrode bodies.

6. The lithium ion battery of claim 1, wherein the partially plastic resin is a polyolefin.

7. The lithium ion battery of claim 1, wherein the partially plastic resin is a polyglycol.

8. The lithium ion battery of claim 1, wherein the partially plastic resin is a silicon.

9. The lithium ion battery of claim 1, wherein the adhesive resin further comprises an organic or inorganic powder.

10. The lithium ion battery of claim 1, wherein the adhesive resin further comprises a fiber.

11. A method for forming a lithium ion battery according to claim 1 comprising, as constituent elements, a laminate electrode body further comprising a positive electrode having a positive electrode active material layer, a negative electrode having a negative electrode active material layer, a positive electrode current collector, and a negative electrode current collector, the constituent elements being impregnated with an electrolytic solution, comprising joining the positive electrode and the negative electrode with an adhesive resin containing an at least partially plastic resin, forming an interface with voids, and deforming the adhesive resin.

12. A method for forming a lithium ion battery according to claim 1, comprising deforming the adhesive resin by applying at least the pressure that causes the plastic resin to undergo plastic deformation.

13. A method for forming a lithium ion battery according to claim 1, wherein the plastic resin is a thermoplastic resin.

14. A method for forming a lithium ion battery according to claim 13, comprising deforming the adhesive resin by heating.

15. A method for forming a lithium ion battery according to claim 14, comprising heating at or above the temperature at which the thermoplastic resin develops flowability.

16. A method for forming a lithium ion battery according to claim 13, comprising deforming the adhesive resin by applying ultrasonic waves under pressure.

* * * * *